Aug. 4, 1959     J. L. McLUCAS     2,898,401

OSCILLOGRAPH RECORDER

Filed May 19, 1955

INVENTOR.
JOHN L. McLUCAS
BY
*Mitchell & Bechert*
ATTORNEYS

2,898,401

OSCILLOGRAPH RECORDER

John L. McLucas, State College, Pa., assignor to Haller, Raymond and Brown, Inc., State College, Pa., a corporation of Pennsylvania Application May 19, 1955, Serial No. 509,563

12 Claims. (Cl. 178—6.6)

My invention relates to improved means for recording the intelligence displayed on a transient display device, such as a cathode-ray oscilloscope. This application discloses improvements over and modification of the devices disclosed in copending patent application Serial No. 393,830, filed November 23, 1953, in the names of Robert V. Higdon and John L. McLucas.

It is an object of the invention to provide an improved oscilloscope recorder of the character indicated.

It is another object to provide an oscilloscope recorder lending itself to the recreation of oscilloscope data whenever and as often as desired.

It is a further object to provide an improved means for compressing the bandwidth of video signals displayed on an oscilloscope.

It is a specific object to meet the above objects with a relatively simple device which may be attached to or supported in front of the face of a conventional cathode-ray oscilloscope, and which, without interfering with visual inspection of the display, may record the display data on storage means, such as magnetic tape, in a manner readily adaptable to subsequent recreation and oscillographic display.

Other objects and various further features of novelty and invention will become apparent or will occur to those skilled in the art from a reading of the following specification in conjunction with the accompanying drawings.

In said drawings, which show, for illustrative purposes only preferred forms of the invention:

Figure 2:
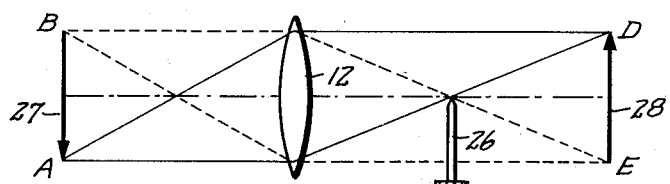
Fig. 2 is an optical diagram, representing a side elevation of the optics of Fig. 1 and illustrating the basic operation of my invention.

Briefly stated, my invention contemplates the use of a particular optical mask as part of an optical scanning system to scan amplitude-modulated oscilloscopic displays. Relying on the persistence characteristics of the display face, my mechanism compresses the bandwidth of the display into a range which either may be easily accommodated on storage means, such as magnetic tape, or may lend itself readily to remote transmission over communication links accommodating audio frequencies.

The scanner itself may take various forms, depending upon the base against which the amplitude modulation is originally displayed. For example, the base may be a circle, and amplitude modulations may take the form of radially outward or inward deviations from the base circle; alternately, the display may be characterized by a lineal base or reference axis for the amplitude modulations. In either event, my scanning mechanism is such as continuously to orient the image of a scanning slit generally transversely to the display base, which, of course, would mean a radial orientation for circular displays and a vertical orientation for horizontally-based displays. An optical mask in the optics including the slit is so placed with respect to the optical axis and with respect to a point of limiting-ray crossover on said axis as to provide varying attenuation of light passing the slit, in accordance with position of the light source in the image of the slit. Thus, photoelectric means responsive to light passing all the way through the system may develop an amplitude-modulated (i.e. intensity-modulated) video signal reflecting amplitude modulation (i.e., spot deviation from the display axis) in the original display.

Bandwidth reduction or compression results, as indicated above, from reliance on the persistence property of the oscilloscope face temporarily to preserve the display transient, and from driving my optical scanner at a rate representing a substantial submultiple of the sweep-recurrence frequency for the base in the original display. Bandwidth reduction can be so substantial, even for transients in the megacycles, that the scanner-output signals may be stored on magnetic tape; these signals may thereafter be played back through the same or through a different oscilloscope, and viewed at leisure. Essentially, my recording process involves writing on the oscilloscope face at a relatively high rate and reading out of the oscilloscope face at a relatively low rate. The original signal applied to the oscilloscope display may either be continuously repetitive, or it may be a transient occurring only once, or it may be gated periodically so that the output stored on the tape is a sample of the original.

In said copending application, wherein an optical wedge (instead of the present optical mask) is employed to provide variable light attenuation, various forms are shown and described whereby the invention may be adapted to most of the cases of interest in laboratory oscilloscope use. Since the details of such arrangements have been fully disclosed in said application, they are omitted in the present disclosure, and the applicability of the present mask modulator in place of the previous wedge modulator will be understood by those skilled in the art.

Figure 1:
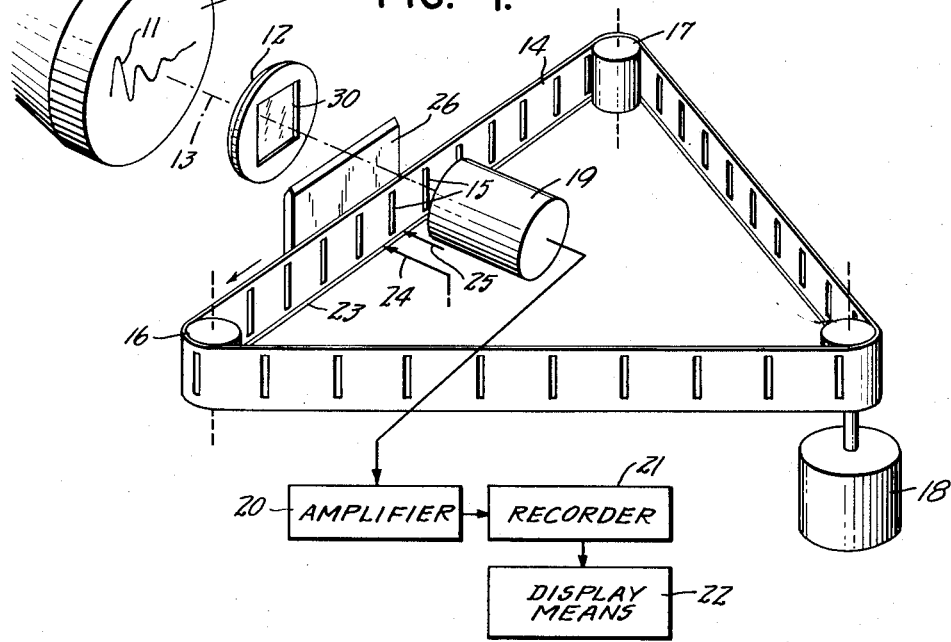
Fig. 1 is a simplified view in perspective of important elements of one embodiment of my invention.

Referring to Fig. 1 of the drawings, my invention is shown in application to a transcribing device for recording, storing, and playing back video signals reflecting the display on the face 10 of a cathode-ray oscillograph. For the case shown, the display 11 on the face 10 represents amplitude modulations in the form of vertical displacements or excursions on a horizontal sweep base. The scanner of my transcriber includes optics, such as a lens 12 on an axis 13, centered on the axis of the display 11. To achieve scanning action along the sweep base, I have shown an endless belt 14 of flexible opaque material having formed therein a plurality of straight slits 15. The belt 14 is supported in the scanning plane by spaced pulleys 16—17, and a drive motor 18 continuously causes the images of successive slits 15 to scan the display 11 in the plane of the face 10. Photoelectric means 19 on the axis 13 responds to any light passing the scanning slits and develops a video signal which may be processed at amplifier 20, for recording at 21 and for redisplay as desired at 22. As disclosed in said application, a strip 23 along one side of the belt 14 may be coated with storage material, such as magnetic iron oxide, and it will be understood that the recording and playback head, designated generally at 24, may form part of the recorder mechanism 21. Erasing means 25 may clean the tape 23 so that fresh video may be stored as the belt 14 is continuously recycled.

In accordance with the invention, light modulation in accordance with vertical displacement or amplitude of the displayed transient 11 is achieved by means of an optical mask or diaphragm 26, and the scanning slits 15 may be straight and parallel-sided, as distinguished from the wedge-shaped slits disclosed in said copending application. The function of such light-modulating means will be better understood by reference to the simplified optical diagram of Fig. 2, wherein the heavy arrow 27 represents the full-amplitude excursion of the object 11, and the heavy arrow 28 represents the imaged amplitude excursion, as in the response plane of photoelectric means 19.

In the diagram of Fig. 2, light originating at point A passes through the lens 12 and is imaged at point D. Likewise, light originating at point B is imaged in the same plane at point E. Without the mask 26 (which may be located in front of or behind lens 12, at the location of limiting-ray crossover), the total light value in the plane D—E is determined by the efficiency of the optical system. However, with the mask 26, light originating at point B is blocked from the plane D—E; and for intermediate positions of the light source (i.e. for points between the points A—B), fractional amounts of light will be intercepted by the mask 26, so that light-source position along the line A—B (plane of display 11) is converted into intensity modulation at the plane D—E.

Figure 3:
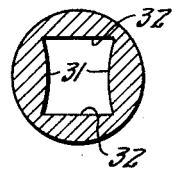
Fig. 3 is a view of a mask utilizable under certain circumstances in place of the mask shown in Fig. 1.

For many purposes, the amplitude-to-intensity conversion achieved with the described elements is sufficient, but in order to approach linearity of conversion, I provide at mask 30 (see Fig. 1) a means for assuring more uniform flux density throughout the light column passing the optics 12. The mask 30 may be a separate window placed near the lens 12, or it may comprise merely opaque material secured to one face of the lens 12. For small angles of view, that is, when relatively long focal lengths are employed, sufficient uniformity of flux density is achieved with a square-apertured mask, as at 30 in Fig. 1; however, for shorter focal lengths, for which the cosine of the spot angle (i.e. angle of the spot off the optical axis 13) is less than unit, it is desirable to make some correction for this fact in the contour of the mask. The necessary contour correction is shown in Fig. 3, wherein the vertical opposed sides 31 of the mask opening are concaved, while the other sides 32 remain parallel. It will be appreciated that the concavity displayed in Fig. 3 has been exaggerated for emphasis. The principles of light modulation involved in the arrangement of Fig. 1 are equally applicable to displays involving a circular sweep base, as is the case for the display 35 on the oscilloscope 36 of Fig. 4. Amplitude modulations on the circular base of display 35 show as radial deviations inwardly and outwardly of the circular sweep base. The scanning mechanism of my transcriber for the case of a circular display may include inclined mirror prisms 37—38 for transposing the optical axis 39 to coincide with the axis 40 of bodily rotation of the scanner assembly, shown contained within a drum 41. The axis of scanning rotation preferably coincides with the center of the circular base of display 35, and in the form shown, the rotating assembly includes optics 42, complete with a mask 43 and a slit 44. Further non-rotated optics 45 converge light passing through the scanning system onto photoelectric means 46. Motor means 47 continuously drives the scanner drum 41 by way of a rim wheel 48, and a pick-off wheel 49 provides, at 50, one-to-one synchronization for remote recording or redisplay purposes. As disclosed in said copending application, the scanner drum may carry a strip of recording material, such as magnetic tape 51, and the electrical output of the cell 46 may be applied in recording relation with the tape 51.

Figure 4:
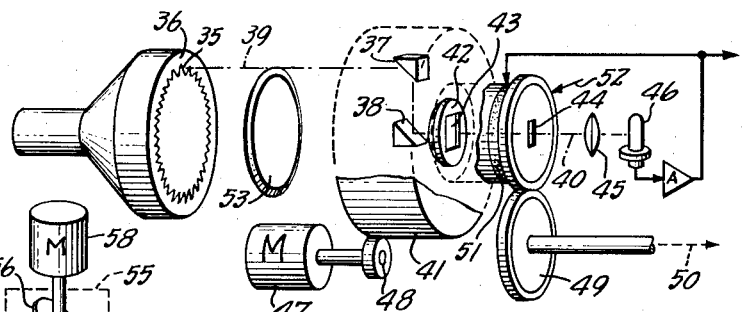
Figs. 4 and 5 are diagrams schematically showing modified combinations.

The light modulation in Fig. 4 is achieved by means of a circular mask 53, centered on the scanning axis and disposed essentially parallel to the circular sweep base of the display 35, so that for any one instant of display transcription, the optical functioning will resemble that described in connection with Fig. 2.

Figure 5:
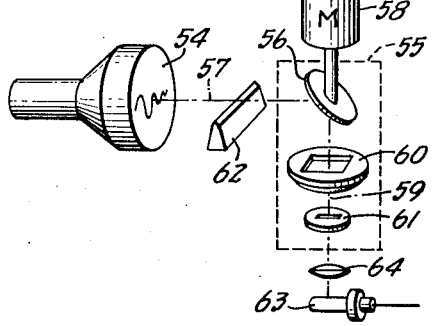

In the arrangement of Fig. 5, I show application of the invention to another lineal base sweep, as presented on the face of the cathode-ray tube 54. Scanning action is achieved by means of a bodily rotated scanner assembly 55 including principally a mirror 56 inclined substantially at 45° to the axis 57; mirror 56 is continuously rotated by motor 58 about an axis 59 substantially perpendicular to the axis 57. The lens and correcting mask 60 and the slit 61 provide part of the rotating scanner assembly 55, but the mask or stop 62 necessary for light modulation may be fixed and not rotated. The video output reflecting amplitude-intensity transcriptions is derived by photocell 63, aided by focusing optics 64.

It will be seen that I have described a basically simple optical system whereby transiently displayed amplitude displacements or excursions may be transcribed into intensity modulations of an electrical video signal. For displays having inherent storage properties, such as cathode-ray tubes, the scanning rate need not be anything near as fast as the sweep rate in the original display. The bandwidth compression thus achieved may be so substantial that very high-speed transients, visible only with high-speed display sweeps, can be reduced to a form for accommodation on a single communication channel, as for example, magnetic recording tape. The mask employed in the arrangement presently described is simple to fabricate and align, and it avoids the problems of wedge construction and alignment of said copending application.

While I have described the invention in detail for the preferred forms shown, it will be understood that modifications may be made within the scope of the invention as described in the claims which follow.

I claim:

1. As an article of manufacture, a cathode-ray-oscilloscope transcriber comprising scanning optics including an elongated slit, projecting means for imaging said slit in the display plane of the oscillographic display to be transcribed, drive means for causing the image of said slit in said plane to traverse the sweep base of the oscillographic display, the image of said slit in said plane being substantially transverse to said sweep base, an optical mask having a cut-off edge on the axis of said projecting means and masking said optics on one side of said edge to the exclusion of the other side, said edge being substantially parallel to said sweep base and being located substantially at a point of limiting-ray crossover on said axis, and video-signal-recording means including photoelectric means responsive to light energy passing through said slit and scanned by said scanning optics.

2. An article according to claim 1, and including substantially at the location of said projecting means a substantially square mask having two opposed sides oriented substantially parallel to the sweep base at the instantaneous location of the image of said slit in said plane.

3. An article according to claim 1, and including substantially at the location of said projecting means a substantially square mask having two opposed sides oriented substantially transverse to the sweep base at the instantaneous location of the image of said slit in said plane.

4. An article according to claim 3, in which said opposed sides are concaved toward each other to the extent necessary to achieve uniform flux density per unit length between the other two sides of said substantially square mask.

5. In combination, an oscilloscope including a display face and means for developing a lineal reference sweep base thereon, scanning optics including an elongated slit, projecting means for imaging said slit on said face, the image of said slit being substantially transverse to said sweep base, said scanner including drive means for causing the image of said slit to traverse said sweep base, an optical mask having a cut-off edge on the axis of said projecting means and masking said optics on one side of said edge to the exclusion of the other side, said edge being substantially parallel to said sweep base and being located substantially at a point of limiting-ray crossover on said axis, and photoelectric means responsive to light passing said slit as said slit effectively traverses the optical axis common to said photoelectric means and to said projection means.

6. The combination of claim 5, in which said slit is formed on an endless opaque belt extending and movable transversely of the optical axis, said drive means being connected to drive said belt transversely of said axis.

7. The combination of claim 5, in which said means for causing traverse movement of the image of said slit includes a mirror inclined substantially at 45° to the axis of projection to said face, and means for driving said mirror about an axis substantially perpendicular to said last-defined axis.

8. In combination, an oscilloscope including a display face and means for developing a lineal reference sweep base thereon, scanning optics including an endless opaque belt having formed thereon a narrow uniform slit extending transversely thereof, projection means for imaging said slit on said display face with an orientation transverse to said sweep base, said belt being supported for continuous movement across the optical axis of said projection means, an optical mask having a cut-off edge on the axis of said projecting means and masking said optics on one side of said edge to the exclusion of the other side, said edge being substantially parallel to said sweep base and being located substantially at a point of limiting-ray crossover on said axis, and photoelectric means responsive to light passing said slit as said slit traverses the optical axis common to said photoelectric means and to said projector means.

9. The combination of claim 8, in which said belt is formed with a plurality of like slits uniformly spaced about the periphery of said belt substantially in accordance with the effective projected width of said sweep base.

10. As an article of manufacture, a cathode-ray-oscilloscope display transcriber, comprising an optical scanner including a mechanically rotatable assembly and means for continuously rotating the same, an elongated optical slit and means for imaging said slit in a given plane in an orientation substantially transverse to the sweep base over which said scanner sweeps the image of said slit, said rotating assembly rotating once for each sweep cycle of said slit along said base, an optical mask having a cut-off edge on the axis of said projecting means and masking said optics on one side of said edge to the exclusion of the other side, said edge being substantially parallel to said sweep base and being located substantially at a point of limiting-ray crossover on said axis, magnetic recording means carried by said assembly and extending circumferentially of the axis of rotation thereof, and means for impressing on said magnetic recording means a signal responsive to light energy passing through said slit and scanned by said scanner.

11. A device according to claim 10, in which the display to be scanned has a circular sweep base with radial modulations thereon, said mask being circular and centered on the axis of said display.

12. In combination, an oscilloscope including a display face and means for developing a lineal reference sweep base thereon, scanning optics including an endless opaque belt having formed thereon a narrow uniform slit extending transversely thereof, projection means for imaging said slit on said display face with an orientation transverse to said sweep base, said belt being supported for continuous movement across the optical axis of said projection means, an optical mask having a cut-off edge on the axis of said projecting means and masking said optics on one side of said edge to the exclusion of the other side, said edge being substantially parallel to said sweep base and being located substantially at a point of limiting-ray crossover on said axis, photoelectric means responsive to light passing said slit as said slit traverses the optical axis common to said photoelectric means and to said projector means, said belt including along one edge thereof a strip of magnetic storage material, and means connecting the output of said photoelectric means in recording relation with said material.

References Cited in the file of this patent

UNITED STATES PATENTS

| | | |
|---|---|---|
| 1,570,490 | Horton | Jan. 19, 1926 |
| 2,113,184 | Sperti | Apr. 5, 1938 |
| 2,176,847 | Cawley | Oct. 17, 1939 |
| 2,183,717 | Keall | Dec. 19, 1939 |
| 2,193,606 | Ulrey | Mar. 12, 1940 |
| 2,203,352 | Goldmark | June 4, 1940 |
| 2,304,814 | Glasser | Dec. 15, 1942 |
| 2,387,832 | Cooney | Oct. 30, 1945 |
| 2,465,849 | Cooney | Mar. 29, 1949 |